United States Patent
Misawa et al.

(10) Patent No.: US 7,633,534 B2
(45) Date of Patent: Dec. 15, 2009

(54) IMAGE CAPTURING APPARATUS, IMAGE CAPTURING METHOD AND IMAGE STORING APPARATUS

(75) Inventors: Atsushi Misawa, Saitama (JP); Masaya Tamaru, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 456 days.

(21) Appl. No.: 11/434,165

(22) Filed: May 16, 2006

(65) Prior Publication Data
US 2007/0064122 A1  Mar. 22, 2007

(30) Foreign Application Priority Data
May 17, 2005  (JP) .............................. 2005-143366

(51) Int. Cl.
*H04N 5/76* (2006.01)
(52) U.S. Cl. ................................. 348/231.2; 348/231.7
(58) Field of Classification Search .............. 348/231.1, 348/231.2, 231.7
See application file for complete search history.

(56) References Cited

U.S. PATENT DOCUMENTS 6,816,190 B1 * 11/2004 Miyazawa ............... 348/231.6

2001/0012072 A1 * 8/2001 Ueno ..................... 348/333.02
2005/0231611 A1 * 10/2005 Anderson et al. ........ 348/231.2

FOREIGN PATENT DOCUMENTS

JP  11-266381 A  9/1999

* cited by examiner

*Primary Examiner*—David L Ometz
*Assistant Examiner*—Dillion Durnford-Geszvain
(74) *Attorney, Agent, or Firm*—Sughrue Mion, PLLC

(57) ABSTRACT

There is provided an image capturing apparatus that enables a user to confirm already captured images on the image capturing apparatus even when the captured images have been transferred out of the image capturing apparatus. The image capturing apparatus has an image capturing section for capturing images, a large memory for storing the images captured by the image capturing section, a small memory whose memory capacity and power consumption are smaller than those of the large memory, an image compressing section for compressing the captured images, a storage processing section for storing the compressed images compressed by the image compressing section to the small memory, a small display section having a less number of pixels than that of the captured images and a display control section for reading the compressed images out of the small memory to display on the small display section.

13 Claims, 7 Drawing Sheets

| IMAGE IDENTIFIER | IMAGE CAPTURING DATE | CAPTURED IMAGE |
|---|---|---|
| #100 | ○:△, ×, ×, 20×× | |
| #200 | ○:△, ×, ×, 20×× | |
| ⋮ | ⋮ | ⋮ |

| IMAGE IDENTIFIER | IMAGE CAPTURING DATE | CAPTURED IMAGE | COMPRESSED IMAGE |
|---|---|---|---|
| #100 | ○:△, ×, ×, 20×× | | |
| #200 | ○:△, ×, ×, 20×× | | |
| ⋮ | ⋮ | ⋮ | ⋮ |

IMAGE CAPTURING APPARATUS, IMAGE CAPTURING METHOD AND IMAGE STORING APPARATUS

CROSS REFERENCE TO RELATED APPLICATION

The present application claims priority from a Japanese Patent Application No. 2005-143366 filed on May 17, 2005, the contents of which are incorporated herein by reference.

BACKGROUND OF THE INVENTION

1. Field of the Invention

The present invention relates to an image capturing apparatus, an image capturing method and an image storing apparatus. More specifically, the invention relates to an image capturing apparatus, an image capturing method and an image storing apparatus which allow captured images to be confirmed.

2. Related Art

There has been proposed an electronic camera having first display means having a function of a finder in capturing an image and second display means (external display monitor) having a function of a monitor in reproducing a captured image and arranged so as to be removable from a main body of the camera, wherein contents displayed on the first display means is differentiated from contents displayed on the external display monitor so that its user can compare the two captured images displayed on the first display means and the external display monitor to select a better image or so that the user can readily confirm an effect of correction made on the captured image as disclosed in Japanese Patent Laid-Open No. 1999-266381 for example.

Here, the captured images are stored in memories provided in the electronic camera and the external display monitor in the invention described in Japanese Patent Application Publication No. 1999-266381. Then, when the user captures a large number of images in a tourist spot for example and a memory capacity of the memory becomes short, the user may replace the memory of the electronic camera or transfer the captured images stored in the memory to a personal computer or the like in order to capture more images. In such a case however, the user is unable to confirm the captured images in the electronic camera any more. Accordingly, it is often the case with the user that the user captures images of landscapes and subjects that have been already captured again or forgets to capture images of landscapes and subjects not captured yet.

Accordingly, it is an object of the invention to provide an image capturing apparatus, an image capturing method and an image storing apparatus, which are capable of solving the above-mentioned problems. This object may be achieved through the combination of features described in independent claims of the invention. Dependent claims thereof specify preferable embodiments of the invention.

SUMMARY OF THE INVENTION

In order to solve the above-mentioned problems, according to a first aspect of the invention, there is provided an image capturing apparatus having an image capturing section for capturing images, a large memory for storing the images captured by the image capturing section, a small memory whose memory capacity is smaller than that of the large memory, an image compressing section for irreversibly compressing the captured images, a storage processing section for storing the compressed images compressed by the image compressing section to the small memory, a small display section having a less number of pixels than that of the captured images and a display control section for reading the compressed images out of the small memory to display on the small display section. The small memory may require less power consumption in reading an image of the same capacity out thereof than that in reading out of the large memory, and the large memory may be a hard disk drive and the small memory may be a semiconductor memory.

The image capturing apparatus may further include a battery for feeding operating power to the image capturing section, the large memory, the small memory, the image compressing section, the storage processing section, the small display section and the display control section, and the storage processing section may transfer a plurality of captured images altogether to the large memory when an empty capacity of the small memory falls below a reference value set in advance. The storage processing section may transfer the captured images from the small memory to the large memory and may store only the compressed images in the small memory when power is fed from the outside.

The large memory may be removable from the image capturing apparatus, and the display control section may be capable of reading the compressed images out of the small memory and of displaying them on the small display section even when the large memory is removed. The storage processing section may store the captured images once in the small memory if the large memory is not attached when images are captured by the image capturing section, may transfer the captured images from the small memory to the large memory when the large memory is connected and may hold only the compressed images in the small memory. The image capturing apparatus may further include a large display section having a larger number of pixels than that of the small display section and the large display section may be provided in a body with the large memory and may display captured images read out of the large memory.

According to a second aspect of the invention, there is provided an image capturing method for capturing images, having an image compressing step of irreversibly compressing the captured images, a storage processing step of storing the compressed images compressed in the image compressing step to a small memory having a less memory capacity than a large memory for storing the captured images captured by an image capturing section and a display control step of reading the compressed images out of the small memory to display on a small display section having a less number of pixels than that of the captured images. In the storage processing step, the captured images may be once stored in the small memory if the large memory is not attached when the images are captured by the image capturing section, and the captured images may be transferred from the small memory to the large memory and only the compressed images may be held in the small memory when the large memory is connected. Further, in the storage processing step, the plurality of captured images may be transferred altogether to the large memory when an empty capacity of the small memory has fallen below a reference value set in advance. The captured images may be also transferred from the small memory to the large memory and only the compressed images may be stored in the small memory when power is being fed from the outside in the storage processing step.

According to a third aspect of the invention, there is provided an image storing apparatus having a large memory for storing captured images, a small memory whose memory capacity is smaller than that of the large memory, an image compressing section for irreversibly compressing the captured images, a storage processing section for storing the compressed images compressed by the image compressing section to the small memory, a small display section having a less number of pixels than a number of pixels of the captured image and a display control section for reading the compressed images out of the small memory to display on the small display section. The image storing apparatus may further include a battery for feeding operating power to the large memory, the small memory, the image compressing section, the storage processing section, the small display section and the display control section. Then, the large memory may be a hard disk drive and the small memory may be a semiconductor memory. The image storing apparatus may further include a large display section having a large number of pixels as compared to the small display section.

It is noted that the summary of the invention described above does not necessarily describe all necessary features of the invention. The invention may also be a sub-combination of the features described above.

According to the invention, the image capturing apparatus enables the user to confirm already captured images on the image capturing apparatus even when the captured images have been transferred from the image capturing apparatus to another storage unit different from the image capturing apparatus.

BRIEF DESCRIPTION OF THE DRAWINGS

FIG. 3 is a table showing a concept of a large memory.

FIG. 4 is a table showing a concept of a small memory.

DETAILED DESCRIPTION OF THE INVENTION

The invention will now be described based on preferred embodiments, which do not intend to limit the scope of the invention, but exemplify the invention. All of the features and the combinations thereof described in the embodiments are not necessarily essential to the invention.

Figure 1:
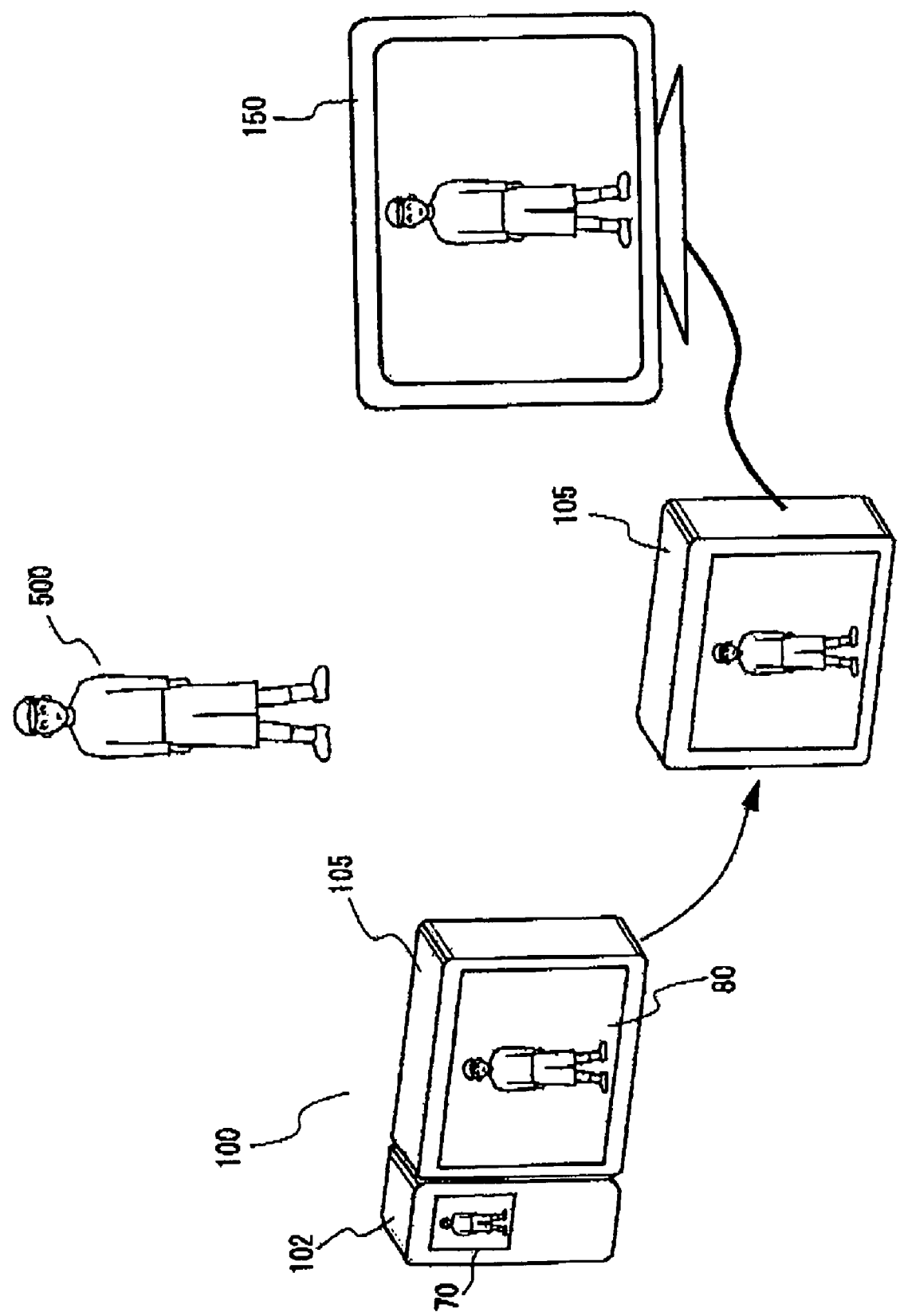
FIG. 1 is a conceptual drawing of an image capturing apparatus.

FIG. 1 is a conceptual drawing of an image capturing apparatus 100. An object of the image capturing apparatus 100 of the embodiment is to enable a user to confirm images which have been already captured on the image capturing apparatus 100 even when the captured images have been transferred from the image capturing apparatus 100 to another storage device different from the image capturing apparatus 100 and to enable the user to confirm the captured image immediately after capturing it.

The image capturing apparatus 100 has an image capturing unit 102 and a display unit 105. The image capturing unit 102 may be constructed so as to be separable from the display unit 105. The user captures an image of a subject 500 through the image capturing unit 102. The image capturing unit 102 stores the captured image once in a storage device provided in the image capturing unit 102. When the image capturing unit 102 is connected with the display unit 105, the captured image is sent from the image capturing unit 102 to the display unit 105 and is stored in a storage device provided in the display unit 105. The image capturing unit 102 also compresses and stores the captured image.

The user can confirm the image captured by the image capturing unit 102 on a large display section 80 of the display unit 105. When the user have captured a large number of images and a memory capacity of the storage device provided in the display unit 105 becomes short, the user can transfer the captured images from the display unit 105 to another storage medium such as an image storing apparatus or to an external display unit 150. Because the compressed images captured by the user are being stored in the image capturing unit 102 also in such a case, the user can capture more images by the image capturing apparatus 100 while confirming the compressed images of the captured images on the small display section 70 of the image capturing unit 102. It is noted that a data amount of compressed images is very small as compared to that of captured images. Accordingly, even if the compressed images are kept in the image capturing unit 102, the memory capacity of the storage device of the image capturing unit 102 in which the captured images are stored is scarcely reduced.

Even when the captured images stored in the image capturing apparatus 100 have been transferred out of the storage device provided in the image capturing apparatus 100 or to the external display unit 150, the image capturing apparatus 100 of the embodiment enables the user to confirm the compressed images of the captured images on the image capturing unit 102. Accordingly, the user can prevent from capturing images of landscape or subjects already captured by the user again or from forgetting to capture images of landscape or subjects not captured yet by the user.

Figure 2:
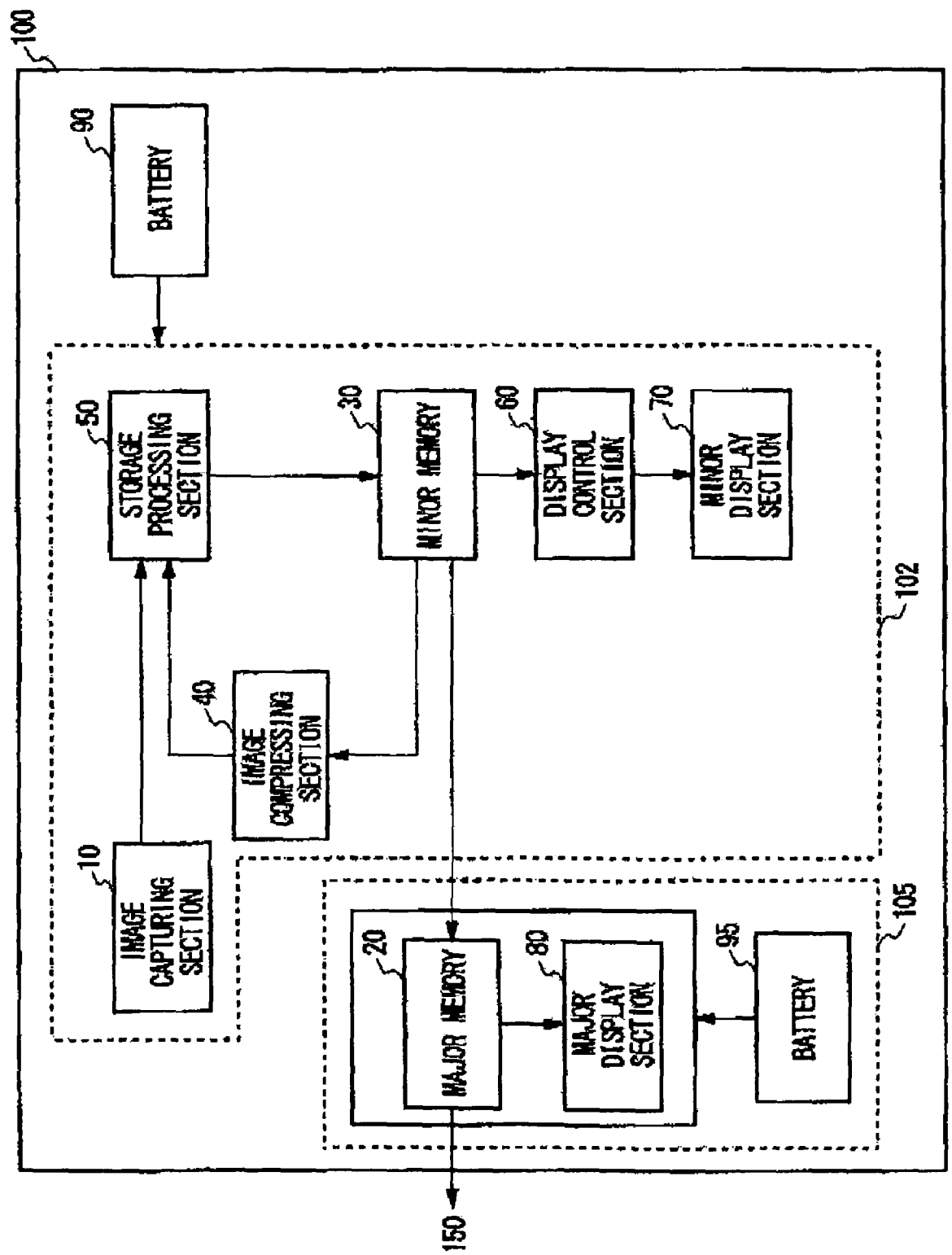
FIG. 2 is a block diagram showing a functional configuration of the image capturing apparatus.

FIG. 2 is a block diagram showing a functional configuration of the image capturing apparatus 100 of the embodiment. The image capturing apparatus 100 has the image capturing unit 102, the display unit 105 and a battery 90. The image capturing unit 102 has an image capturing section 10, a small memory 30, an image compressing section 40, a storage processing section 50, a display control section 60 and a small display section 70. The display unit 105 also has a large memory 20, a large display section 80 and a battery 95.

An image captured by the image capturing section 10 is stored in the large memory 20 provided within the display unit 105 when the display unit 105 is connected with the image capturing unit 102. It is noted that the large memory 20 is a storage device for storing captured images captured by the image capturing section 10 and may be a hard disk drive using a magnetic recording medium for example. The large memory 20 may be arranged as a storage device freely removable from the image capturing apparatus 100.

When the display unit 105 is not connected with the image capturing unit 102, i.e., when the large memory 20 is not connected with the image capturing unit 102, when an image is captured by the image capturing section 10, the image may be stored once in the small memory 30 by the storage processing section 50. Here, the small memory 30 is a storage device whose memory capacity is smaller than that of the large memory 20 and may be a semiconductor memory such as a flash memory for example. The small memory 30 may require power consumption smaller than that of the large memory 20 in reading a captured image of the same capacity. It is noted that the storage processing section 50 may store the image captured by the image capturing section 10 once in the small memory 30 even when the large memory 20 is connected with the image capturing unit 102.

The captured image stored in the large memory 20 is sent to the image compressing section 40. Still more, when the captured image is stored in the small memory 30, the captured image is sent to the image compressing section 40. The image compressing section 40 irreversibly compresses the received captured image. The image compressing section 40 may use such image compressing method as JPEG in irreversibly compressing a still image. The image compressing section 40 may also use such image compressing method as MPEG in irreversibly compressing a motion image. The image compressing section 40 sends the compressed image to the storage processing section 50.

The image compressing section 40 may reduce size or resolution of the image as means for irreversibly compressing images. The captured image stored in the large memory 20 may be also compressed. In such a case, the image compressing section 40 may compress the captured image at high compression rate as means for irreversibly compressing images. More preferably, the image compressing section 40 may increase the image compression rate by reducing a number of components of frequency component to be stored or by reducing a number of bits representing level of the frequency component in storing the images by frequency-converting per region for example.

The storage processing section 50 receives the compressed image from the image compressing section 40 and sends the compressed image to the small memory 30. The small memory 30 stores the compressed image by correlating with an image identifier that allows the received compressed image and the captured image that is the image before it has been compressed to be uniquely identified. When the image captured by the image capturing section 10 is stored once in the small memory 30, the storage processing section 50 may transfer the plurality of captured images stored in the small memory 30 altogether to the large memory 20. Still more, the storage processing section 50 may transfer the captured image stored in the small memory 30 automatically to the large memory 20. It is noted that the storage processing section 50 may store the image captured by the image capturing section 10 once in the small memory 30 and then may transfer it to the large memory 20 during when no image is captured. Then, the storage processing section 50 may store the image captured by the image capturing section 10 once in the small memory 30 and may transfer the captured images altogether to the large memory 20 during when no image is captured.

For example, the storage processing section 50 may transfer the captured images automatically from the small memory 30 to the large memory 20 when no power is fed at least to part of the components of the image capturing apparatus 100 except of the storage processing section 50 and the small memory 30. It is noted that the time when the storage processing section 50 transfers the plurality of captured images altogether from the small memory 30 to the large memory 20 may be when a number of images set in advance is stored in the small memory 30. Because the storage processing section 50 reduces driving time of the large memory 20 whose power consumption is larger than that of the small memory 30 by moving the plurality of captured images altogether from the small memory 30 to the large memory 20, the power consumption of the image capturing apparatus 100 may be reduced.

Still more, the storage processing section 50 may transfer the plurality of captured images altogether to the large memory 20 when an empty capacity of the memory capacity of the small memory 30 falls below a reference value set in advance. It allows the power consumption of the image capturing apparatus 100 to be significantly saved because a number of times of starting, driving and stopping the large memory 20 is reduced as compared to a case of operating the large memory 20 to hold a captured image every time when the image is captured by the image capturing section 10. It is noted that the captured images stored in the small memory 30 may be erased when they are transferred from the small memory 30 to the large memory 20.

Still more, the storage processing section 50 may transfer the captured images from the small memory 30 to the large memory 20 to hold compressed images in the small memory 30 when power is fed from the outside of the image capturing apparatus 100. When no power is fed from the outside of the image capturing apparatus 100, the storage processing section 50 may hold the process for transferring the captured images to the large memory 20 without transferring the captured images from the small memory 30 to the large memory 20 until when power is fed to the image capturing apparatus 100. It allows the usable time of the battery 90 of the image capturing apparatus 100 and the battery 95 to be prolonged because the battery 90 of the image capturing apparatus 100 and the battery 95 are not used in transferring the captured images. Accordingly, the use can capture more images by the image capturing apparatus 100.

Still more, the storage processing section 50 may transfer the captured images, that were stored once in the small memory 30 by the storage processing section 50 when the large memory 20 was not connected with the image capturing unit 102, from the small memory 30 to the large memory 20 when the large memory 20 is connected with the image capturing unit 102. Then, the storage processing section 50 may keep the compressed images in the small memory 30. The small memory 30 sends the compressed images to the display control section 60. The large memory 20 also sends the captured images to the large display section 80 and to the external display unit 150.

The display control section 60 sends the compressed image received from the small memory 30 to the small display section 70. Then, the small display section 70 displays the received compressed image. Here, the small display section 70 may be a display unit such as a liquid crystal display having a less number of pixels than that of the captured images. Then, the user can confirm the compressed image read out of the small memory 30 in the small display section 70 provided in the image capturing unit 102 even when the large memory 20 is detached from the image capturing apparatus 100.

Here, power consumed for displaying the compressed image on the small display section 70 is small as compared to a case of displaying the captured image on the small display section 70 because a data amount of the compressed image is small as compared to that of the captured image. Accordingly, the power consumed in displaying an image on the small display section 70 may be suppressed when the compressed image is displayed on the small display section 70 as compared to the case when the uncompressed captured image is displayed on the small display section 10. Still more, because a semiconductor memory consumes less power in reading and writing an image out of/on as compared to a hard disk drive, the power consumption may be lessened further when the small memory 30 is the semiconductor memory as compared to a case when the small memory 30 is a hard disk drive.

The large display section 80 has a lot number of pixels as compared to that of the small display section 70 and may be combined in a body with the large memory 20. The large display section 80 may be a liquid crystal display for example and may be a display that is capable of clearly displaying the captured image more than the small display section 70. Then, the large display section 80 reads the captured image out of the large memory 20 to display thereon. Still more, the external display unit 150 may be a display that displays the captured image received from the large memory 20 and may be a monitor of a PC and a TV monitor such as HDTV. Still more, the external display unit 150 may be provided with a storage device such as a hard disk and may store the captured image received from the large memory 20.

It is noted that the battery 90 feeds operating power to each section of the image capturing section 10, the small memory 30, the image compressing section 40, the storage processing section 50, the display control section 60 and the small display section 70 provided in the image capturing unit 102. The battery 95 also feeds operating power to the large memory 20 and the large display section 80 provided in the display unit 105.

The image capturing apparatus 100 of the present embodiment is thus capable of storing the compressed image in the image capturing unit 102 of the image capturing apparatus 100. It then enables the user to confirm the images already captured by the image capturing apparatus 100 by the compressed images even if the captured images have been transferred out of the image capturing apparatus 100. Accordingly, the user can prevent from capturing again a subject already captured or from forgetting to capture an image of a subject not captured yet even when the user captured a large number of images.

Still more, the image capturing apparatus 100 of the present embodiment allows the captured image to be stored once in the small memory 30 whose power consumption is smaller than that of the large memory 20 and the image to be transferred from the small memory 30 to the large memory 20 when a predetermined condition is met. It enables the user to capture images while suppressing the power consumption of the image capturing apparatus 100. It also enables the user to capture images of various landscapes and subjects for a long period of time by reducing the power consumption of the image capturing apparatus 100 when the image capturing apparatus 100 is driven by the power of the battery.

Still more, the image capturing apparatus 100 of the embodiment allows the captured image to be stored once in the small memory 30 and to be transferred from the small memory 30 to the large memory 20 when a predetermined condition is met. For example, the storage processing section 50 starts automatically when the user disconnects the power source of the image capturing apparatus 100 and transfers the captured image from the small memory 30 to the large memory 20. It enables the user to capture images without taking notice on the empty capacity of the small memory 30.

FIG. 3 is a table showing one concept of the large memory 20 of the embodiment. The large memory 20 stores images captured by the image capturing section 10 by correlating with image identifiers that allow the captured images to be uniquely identified. The large memory 20 may store file names correlated with the captured images by correlating with the image identifiers that allow the captured images to be uniquely identified.

The large memory 20 may be a storage device having a large memory capacity and may be a hard disk composed of a magnetic recording medium for example. The large memory 20 may be arranged in a body with the large display section 80 or may be removable from the image capturing apparatus 100. The user can display the captured image on the large display section 80 and can confirm the large and clear captured image than that in the small display section 70 by arranging the large memory 20 in a body with the large display section 80.

Still more, the large memory 20 may store image capturing conditions such as image capturing time and date when the captured image was captured, image capturing place, focal distance and others by correlating with the image identifier.

When the captured image is transferred from the large memory 20 to the external display unit 150, the captured image stored in the large memory 20 may be erased. It allows captured images to be stored again in the large memory 20 because it increases the empty capacity of the memory capacity of the large memory 20.

FIG. 4 is a table showing one concept of the small memory 30. The small memory 30 stores the compressed images compressed by the image compressing section 40 by correlating with image identifiers that allow the compressed images to be uniquely identified. The small memory 30 may store file names correlated with the compressed images by correlating with the image identifiers that allow the compressed images to be uniquely identified.

The small memory 30 may be a storage device whose memory capacity and power consumption are smaller than those of the large memory 20 and may be a semiconductor memory such as a flash memory. The small memory 30 also stores images captured by the image capturing section 10 by correlating with the image identifiers that allow the captured images to be uniquely identified. Still more, the small memory 30 may store image capturing conditions such as image capturing time and date, image capturing place, a focal distance and the like by correlating with image identifiers. When the storage processing section 50 transfers the captured images from the small memory 30 to the large memory 20, the captured images stored in the small memory 30 may be erased. It allows the empty capacity of the memory capacity of the small memory 30 to be maintained.

Figure 5:
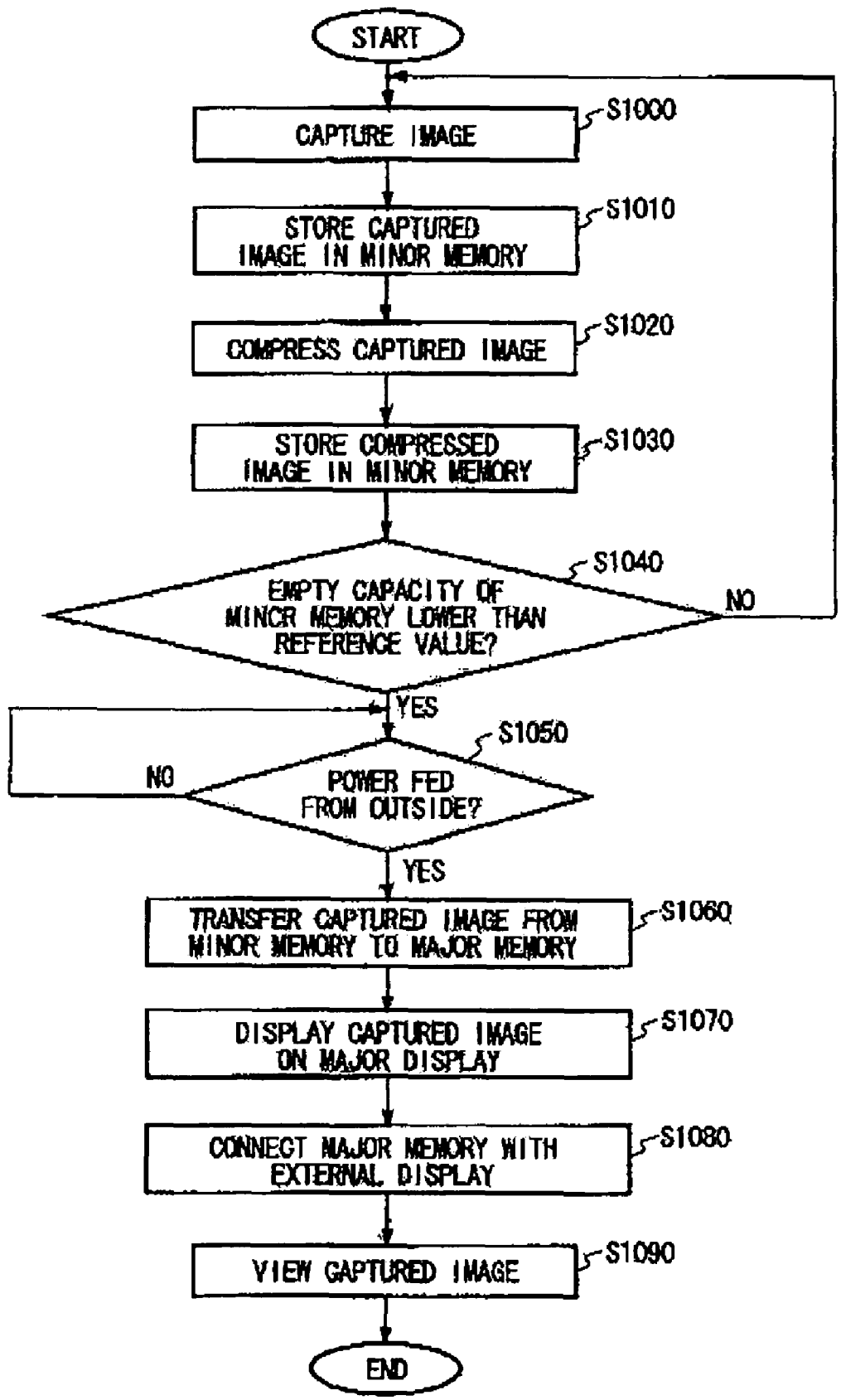
FIG. 5 is a flowchart showing a flow of processes of the image capturing apparatus.

FIG. 5 is a flowchart showing a flow of processes of the image capturing apparatus 100 of the present embodiment. At first, an image is captured by the image capturing section 10 in Step S1000. The storage processing section 50 stores the image captured by the image capturing section 10 in the small memory 30 by correlating with the image identifier that allows the captured image to be uniquely identified in Step S1010. The captured image may be also stored in the large memory 20 after being captured by the image capturing section 10 by correlating with the image identifier. Next, the captured image stored in the small memory 30 or the large memory 20 is sent to the image compressing section 40. The image compressing section 40 compresses the received image and generates a compressed image in Step S1020. The image compressed by the image compressing section 40 is sent from the image compressing section 40 to the storage processing section 50 and is then sent to the small memory 30 via the storage processing section 50. The small memory 30 stores the compressed image received from the storage processing section 50 by correlating with the image identifier that allows the compressed image to be uniquely identified in Step S1030.

Then, the small memory 30 sends the compressed image to the display control section 60. Successively, the display control section 60 sends the compressed image received from the small memory 30 to the small display section 70 that is a display having a less number of pixels than that of the captured image. Then, the small display section 70 displays the received compressed image. Here, the compressed image has less data amount as compared to the captured image. It allows a usable life of the battery 90 of the image capturing apparatus 100 to be prolonged because power consumption in reading a compressed image out of the small memory 30 is small as compared to a case of reading a captured image. It is noted that because the power consumption of the image capturing apparatus 100 decreases based on an image compression factor in compressing a captured image into a compressed image, the usable life of the battery 90 of the image capturing apparatus 100 may be adjusted based on the image compression factor.

Next, the storage processing section 50 judges whether or not the empty capacity of the small memory 30 has fallen below the reference value set in advance in Step S1040. When the empty capacity of the small memory 30 has not fallen below the reference value set in advance, i.e., No in Step S1040, the captured images and compressed images are stored continuously in the small memory 30. When the empty capacity of the small memory 30 has fallen below the reference value set in advance on the other hand, i.e., Yes in Step S1040, the storage processing section 50 confirms whether or not power is being fed to the image capturing apparatus 100 from the outside in Step S1050. When no power is being fed to the image capturing apparatus 100 from the outside, i.e., No in Step S1050, the storage processing section 50 stops the process to be continued and stands by until when power is fed to the image capturing apparatus 100 from the outside.

When power is being fed to the image capturing apparatus 100 from the outside on the other hand, i.e., Yes in Step S1050, the storage processing section 50 transfers the captured images from the small memory 30 to the large memory 20 and stores the compressed images in the small memory 30 in Step S1060. Then, the large memory 20 stores the captured images received from the small memory 30 by correlating with the image identifiers. Next, the large memory 20 sends the captured image to the large display section 80. The large display section 80 displays the received image in Step S1070.

It enables the user to readily confirm the captured images on the display unit 105 provided in the image capturing apparatus 100 even if there is no external display unit 150 during traveling for example.

Still more, because the compressed images obtained by compressing the captured images are stored in the small memory 30 of the image capturing unit 102 provided in the image capturing apparatus 100, the user can confirm the captured images already captured as the compressed images on the image capturing unit 102 even when the captured images have been transferred from the large memory 20 in the display unit 105 to another storage device or to the external display unit 150 and the like. Accordingly, it enables the user to prevent from capturing images already captured again or from forgetting to capture images not captured yet.

When the large memory 20 is connected with the external display unit 150, the captured images may be sent from the large memory 20 to the external display unit 150 in Step S1080. Then, the external display unit 150 displays the captured images received from the large memory 20. It enables the user to appreciate the captured images on a screen larger than the large display section 80 in Step S1090.

Figure 6:
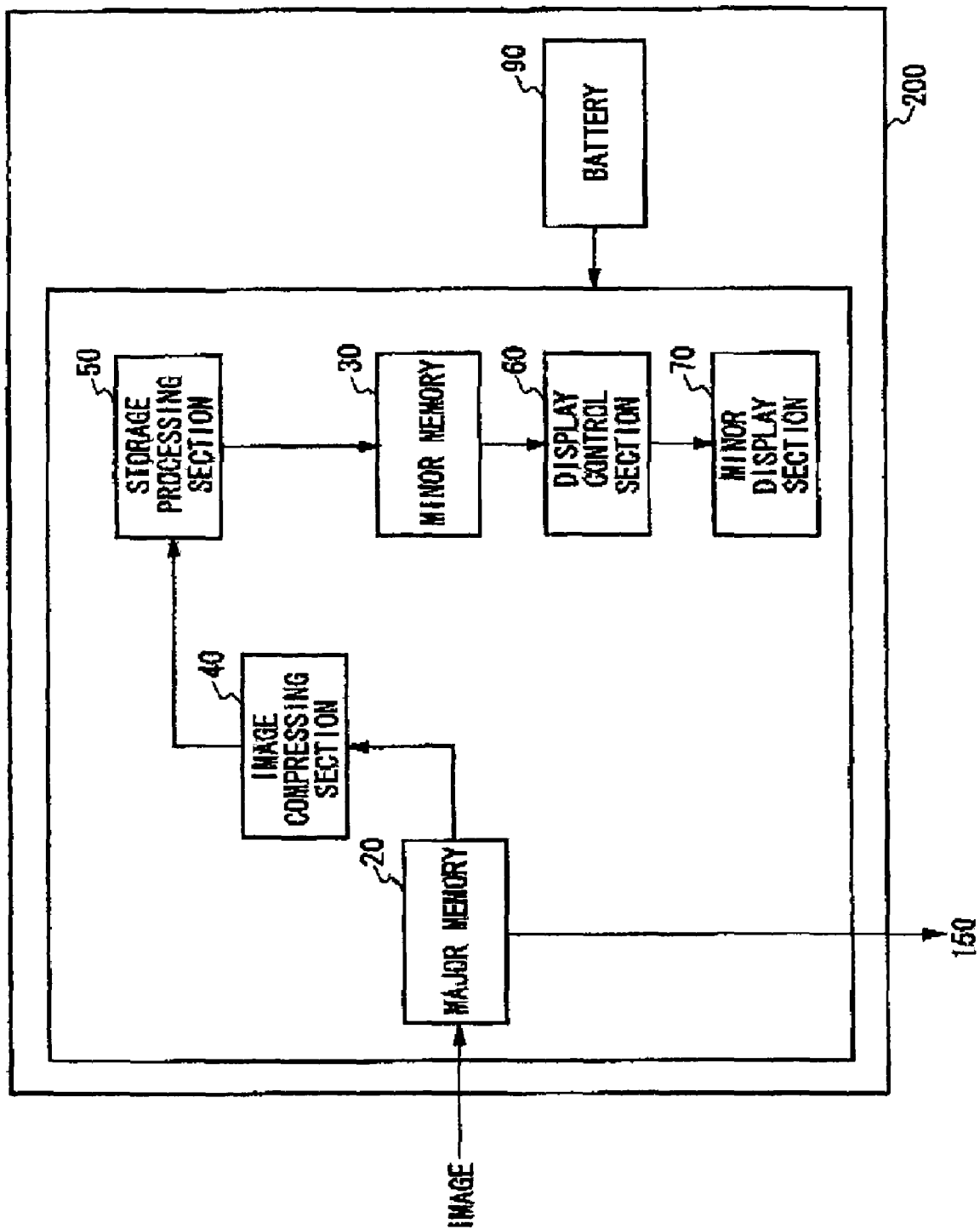
FIG. 6 is a block diagram showing a functional configuration of an image storing apparatus.

FIG. 6 is a block diagram showing a functional configuration of an image storing apparatus 200 of the embodiment. The image storing apparatus 200 has a large memory 20, a small memory 30, an image compressing section 40, a storage processing section 50, a display control section 60, a small display section 70 and a battery 90. Here, the large memory 20, the small memory 30, the image compressing section 40, the storage processing section 50, the display control section 60, the small display section 70 and the battery 90 have the same functions with those denoted by the same reference numerals and explained in the above description in connection with FIG. 2, so that their detailed explanation will be omitted here.

The image storing apparatus 200 receives a large number of captured images from the image capturing apparatus 100, the memories and a network such as Internet. The large memory 20 stores the received captured images by correlating with the image identifiers that allow the captured images to be uniquely identified. Then, the large memory 20 sends the stored captured images to the image compressing section 40 and the image compressing section 40 compresses the received captured images. It is noted that the large memory 20 may send the captured images to the external display unit 150. The user can appreciate the captured images on a large screen by sending the captured images to the external display unit 150. The image storing apparatus 200 may have a large display having a large number of pixels as compared to that of the small display section 70. When the image storing apparatus 200 is provided with the large display section, the user can confirm the captured images that are larger and clearer than the compressed images on the image storing apparatus 200.

The storage processing section 50 sends the compressed images compressed by the image compressing section 40 to the small memory 30 and the small memory 30 stores the compressed images by correlating with image identifiers that allow the compressed images to be uniquely identified. Then, the small memory 30 sends the compressed images to the display control section 60. The display control section 60 then sends the received compressed images to the small display section 70. The small display section 70 displays the received compressed images. It is noted that the battery 90 feeds operating power to each section of the large memory 20, the small memory 30, the image compressing section 40, the storage processing section 50, the display control section 60 and the small display section 70 within the image storing apparatus 200.

The image storing apparatus 200 of the present embodiment can store the large number of captured images received from the image capturing apparatus 100 and can display the compressed images of the captured images. Thereby, the user can confirm the images already captured as the compressed images on the image storing apparatus 200 separated from the image capturing apparatus 100. Accordingly, it enables the user to efficiently capture images to be appreciated because it allows such images to be captured by dividing work to the user who captures the images by the image capturing apparatus 100 and another user who gives instructions or the like to the user having the image capturing apparatus 100 so as to capture a subject whose image has not been captured yet while watching the image storing apparatus 200.

Figure 7:
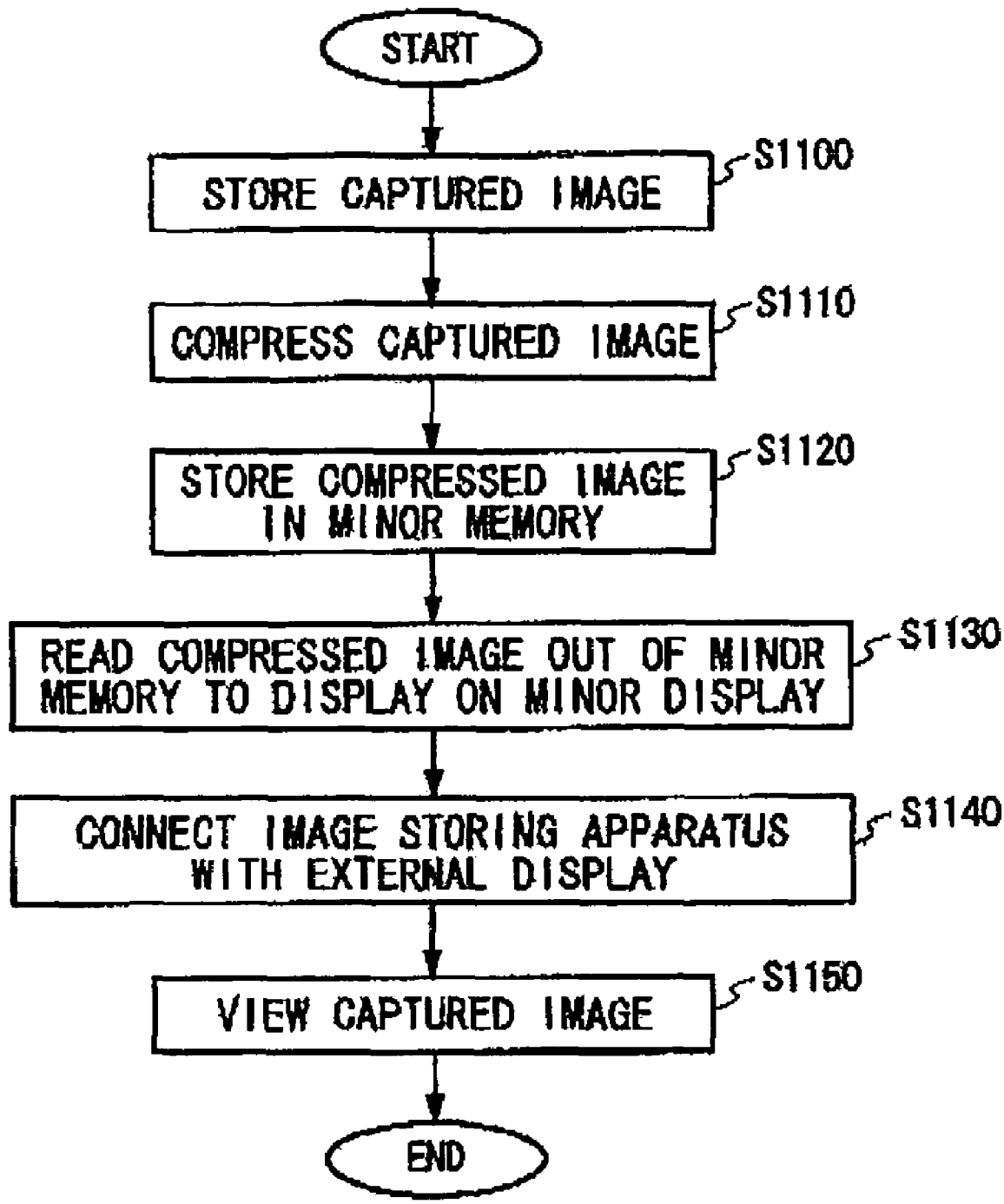
FIG. 7 is a flowchart showing a flow of processes of the image storing apparatus.

FIG. 7 is a flowchart showing a flow of processes of the image storing apparatus 200. At first, the image storing apparatus 200 receives captured images from the image capturing apparatus 100 or the like and the large memory 20 stores the received captured images by correlating with image identifiers that allow the captured images to be uniquely identified in Step S1100. The large memory 20 sends the stored captured images to the image compressing section 40. The image compressing section 40 compresses the received captured images in Step S1110. When the image compressing section 40 receives a still image for example, the image compressing section 40 may compress the captured image by using such image compressing method as JPEG. When the image compressing section 40 receives a motion image, the image compressing section 40 may compress the captured image by using such image compressing method as MPEG.

The image compressing section 40 sends the compressed images to the storage processing section 50. Then, the storage processing section 50 sends the compressed images compressed by the image compressing section 40 to the small memory 30. The small memory 30 stores the received compressed images by correlating with the image identifiers that allow the compressed images to be uniquely identified in Step S1120. Next, the small memory 30 sends the compressed images to the display control section 60. The display control section 60 reads the compressed images out of the small memory 30 and displays the compressed images on the small display section 70 in Step S1130.

When the image storing apparatus 200 is connected with the external display unit 150 in Step S1140, the captured images are sent from the large memory 20 of the image storing apparatus 200 to the external display unit 150, so that the user can appreciate the captured images on the external display unit 150 in Step S1150.

Although the invention has been described by way of the exemplary embodiments, it should be understood that those skilled in the art might make many changes and substitutions without departing from the spirit and scope of the invention.

It is obvious from the definition of the appended claims that the embodiments with such modifications also belong to the scope of the invention.

What is claimed is:

1. An image capturing apparatus, comprising:
    an image capturing unit including:
        an image capturing section that captures an image;
        an image compressing section that compresses the image captured by said image capturing section and produces a compressed image;
        a first memory having a first memory capacity that stores the image captured by said image capturing section and the compressed image, and wherein said first memory requires a first power consumption;
        a first display section that displays the compressed image and having a first number of pixels which is less than that of said image captured by said image capturing section, and
        a large memory unit which is removable from said image capturing unit, comprising a second memory having a second memory capacity which is larger than said first memory capacity of said first memory, said second memory storing the image transferred from said first memory when a predetermined condition is met, said second memory requires a second power consumption which is larger than said first power consumption of said first memory,
    wherein said first memory requires less power consumption in reading an image of the same capacity out thereof than that in reading out of said second memory,
    wherein said second memory is a hard disk drive and said first memory is a semiconductor memory,
    a battery that feeds operating power to said image capturing section, said second memory, said first memory, said image compressing section, and said first display section,
    wherein said image capturing unit further includes a storage processing section which transfers a plurality of images captured by said image capturing section altogether to said second memory when an empty capacity of said first memory falls below a reference value set in advance,
    wherein said storage processing section transfers the images captured by said image capturing section from said first memory to said second memory and stores only the compressed images in said first memory when power is supplied from the outside.

2. The image capturing apparatus as set forth in claim 1, wherein said image compressing section reduces size or resolution of the image captured by said image capturing section and produces a reduced image.

3. The image capturing apparatus as set forth in claim 2, wherein said image compressing section irreversibly compresses the image captured said image capturing section.

4. The image capturing apparatus as set forth in claim 1, wherein said storage processing section is triggered to transfer the images captured by said image capturing section from said first memory to said second memory and store only the compressed images in said first memory when power is initially connected from the outside.

5. An image capturing apparatus, comprising:
    an image capturing unit including:
        an image capturing section that captures an image;
        an image compressing section that compresses the image captured by said image capturing section and produces a compressed image;
        a first memory having a first memory capacity that stores the image captured by said image capturing section and the compressed image, and wherein said first memory requires a first power consumption;
        a first display section that displays the compressed image and having a first number of pixels which is less than that of said image captured by said image capturing section, and
        a large memory unit which is removable from said image capturing unit, comprising a second memory having a second memory capacity which is larger than said first memory capacity of said first memory, said second memory storing the image transferred from said first memory when a predetermined condition is met, said second memory requires a second power consumption which is larger than said first power consumption of said first memory,
    wherein said image capturing unit further includes a display control section that reads the compressed images out of said first memory and displays them on said first display section when said second memory is removed;
    a storage processing section which:
        stores the image captured by said image capturing section once in said first memory when said second memory is not attached when image is captured by said image capturing section;
        transfers the image captured by said image capturing section from said first memory to said second memory when said large memory unit is connected to said image capturing unit; and
        holds only the compressed images in said first memory after the image is transferred.

6. The image capturing apparatus as set forth in claim 5, wherein said large memory unit further comprises a second display section having a larger number of pixels than that of said first display section, and wherein said second display section displays the images read out of said second memory.

7. The image capturing apparatus as set forth in claim 5, wherein said storage processing section is triggered to transfer the image captured by said image capturing section from said first memory to said second memory when said large memory unit is initially connected to said image capturing unit.

8. The image capturing apparatus as set forth in claim 5, wherein said image compressing section reduces size or resolution of the image captured by said image capturing section and produces a reduced image.

9. The image capturing apparatus as set forth in claim 8, wherein said image compressing section irreversibly compresses the image captured said image capturing section.

10. An image capturing method comprising:
    capturing an image;

compressing the image captured by said image capturing and producing a compressed image;

storing on a first memory, which has a first memory capacity and requires a first power consumption, the image captured by said image capturing and the compressed image;

displaying the compressed image on a first display having a first number of pixels which is less than that of the image captured by said image capturing;

transferring the image captured by said capturing from said first memory to a second memory which has a second memory capacity which is larger than the first memory capacity of the first memory and requires a second power consumption which is larger than the first power consumption of the first memory; and storing the image transferred from the first memory on the second memory when a predetermined condition is met, wherein the image captured by said image capturing is once stored in said first memory if said second memory is not attached when the image is captured by said image capturing, and the image captured by said image capturing is transferred from said first memory to said second memory and only the compressed image is held in said first memory when said second memory is connected to said first memory.

11. The image capturing method as set forth in claim 10, wherein the plurality of images captured by said image capturing are transferred altogether to said second memory when an empty capacity of said first memory has fallen below a reference value set in advance in said storage processing step.

12. The image capturing method as set forth in claim 10, wherein the image captured by said image capturing is transferred from said first memory to said second memory and only the compressed image is stored in said first memory when power is sent from the outside.

13. The image capturing method as set forth in claim 10, wherein said compressing reduces size or resolution of the image captured by said capturing and produces a reduced image.

* * * * *